(12) United States Patent
Xu et al.

(10) Patent No.: US 11,737,469 B1
(45) Date of Patent: Aug. 29, 2023

(54) ULTRASONIC RAPID FREEZING EQUIPMENT AND METHOD FOR MEAT INDUSTRY

(71) Applicant: Hefei University of Technology, Hefei (CN)

(72) Inventors: Baocai Xu, Hefei (CN); Zhaoming Wang, Hefei (CN); Bao Zhang, Hefei (CN); Hui Zhou, Hefei (CN); Kezhou Cai, Hefei (CN)

(73) Assignee: Hefei University of Technology, Hefei (CN)

( * ) Notice: Subject to any disclaimer, the term of this patent is extended or adjusted under 35 U.S.C. 154(b) by 0 days.

(21) Appl. No.: 18/074,529

(22) Filed: Dec. 5, 2022

(30) Foreign Application Priority Data

Aug. 5, 2022 (CN) .......................... 202210935643.X

(51) Int. Cl.
*A23B 4/06* (2006.01)
*F25D 3/11* (2006.01)
*A23L 3/36* (2006.01)
*A23L 3/00* (2006.01)

(52) U.S. Cl.
CPC .............. *A23B 4/064* (2013.01); *A23L 3/001* (2013.01); *A23L 3/362* (2013.01); *F25D 3/11* (2013.01); *A23V 2002/00* (2013.01)

(58) Field of Classification Search
CPC ......... A23B 4/064; A23B 4/015; A23L 3/001; A23L 3/362; F25D 3/11; B65G 41/02; B65G 41/003; B65G 47/74; B65G 37/00; Y02P 60/85
See application file for complete search history.

(56) References Cited

U.S. PATENT DOCUMENTS

| 4,030,898 A | * | 6/1977 | Morita ................... A23L 3/361 |
| | | | 62/375 |
| 6,148,618 A | * | 11/2000 | Malmberg ............ F25D 13/067 |
| | | | 62/380 |
| 2020/0198900 A1 | * | 6/2020 | Hartmann ............ B65G 37/005 |

(Continued)

FOREIGN PATENT DOCUMENTS

| CN | 204648736 U | * | 9/2015 | |
| CN | 204648736 U | | 9/2015 | |
| CN | 108016837 A | * | 5/2018 | ............. B65G 37/00 |

(Continued)

*Primary Examiner* — Frantz F Jules
*Assistant Examiner* — Martha Tadesse
(74) *Attorney, Agent, or Firm* — Bayramoglu Law Offices LLC

(57) ABSTRACT

An equipment body of an ultrasonic rapid freezing equipment is provided with a placement cavity, and the placement cavity is provided with a first electric telescopic rod. The bottom end of the first electric telescopic rod is provided with a receiving plate connected to a movable plate, and the movable plate is driven by a motor to rotate. The equipment body is provided with a first conveyor belt, and the inner end of the first conveyor belt is equipped with a second conveyor belt. The second conveyor belt is located on a mounting frame, and the bottom of the mounting frame is connected to a second electric telescopic rod. The bottom end of the second electric telescopic rod is connected to a moving block, the roller at the bottom of the moving block is located in the track on the top surface of the supporting block.

15 Claims, 3 Drawing Sheets

(56) References Cited

U.S. PATENT DOCUMENTS

2021/0259288 A1* 8/2021 Xie ..................... A23L 3/001

FOREIGN PATENT DOCUMENTS

| CN | 109043292 | A | * | 12/2018 |
| CN | 109081097 | A | * | 12/2018 |
| CN | 208499614 | U | * | 2/2019 |
| CN | 106969538 | B |   | 4/2019 |
| CN | 208745014 | U | * | 4/2019 |
| CN | 110902280 | A | * | 3/2020 |
| CN | 210869695 | U | * | 6/2020 |
| CN | 212179323 | U | * | 12/2020 |
| CN | 217154633 | U | * | 8/2022 |

\* cited by examiner

ULTRASONIC RAPID FREEZING EQUIPMENT AND METHOD FOR MEAT INDUSTRY

CROSS REFERENCE TO THE RELATED APPLICATIONS

This application is based upon and claims priority to Chinese Patent Application No. 202210935643.X, filed on Aug. 5, 2022, the entire contents of which are incorporated herein by reference.

TECHNICAL FIELD

The invention relates to the technical field of freezing equipment, in particular to an ultrasonic rapid freezing equipment and a method for meat industry.

BACKGROUND

Ultrasonic assisted freezing technology is a green freezing technology which combines ultrasonic technology with food freezing technology. This technology uses the cavitation effect, thermal effect and mechanical effect produced in the process of ultrasonic propagation in the medium to control the formation of crystal nuclei and affect the growth process of ice crystals, so as to achieve the purpose of improving the quality of frozen food. The biggest advantage of this technology is that ultrasound can only improve the macro and micro structure of frozen food at the physical level of food, so as to ensure the safety of frozen food. It can not only meet consumers' demand for the palatability of frozen food but also meet their demand for food safety. At the same time, it conforms to the trend of the food industry's transformation to the direction of green environmental protection.

At present, in the process of ultrasonic freezing in meat industry, it is often necessary to manually put the meat into the freezing equipment for freezing. After the freezing, it is necessary to manually remove the meat. This process is very complex, time-consuming and laborious, and inefficient.

SUMMARY

The invention provides an ultrasonic rapid freezing equipment and a method for meat industry, which can overcome a defect or some defects of the prior art.

According to the invention, an ultrasonic rapid freezing equipment for meat industry comprises an equipment body, and a placement cavity with an upward opening is arranged in the equipment body. A cavity opening is provided with a cavity door, and a vertical first electric telescopic rod is arranged in the cavity. The bottom end of the first electric telescopic rod is provided with a receiving plate, and the left and right sides of the receiving plate are respectively rotated and connected to a movable plate. The movable plate is driven by a motor to rotate, and the inner end of the two movable plates is connected to an elastic strip. The left and right sides of the top of the equipment body are respectively provided with inclined slide plate;

Both sides of the equipment body are respectively provided with a first conveyor belt, the inner end of the first conveyor belt is equipped with a second conveyor belt, and the second conveyor belt can be extended into the placement cavity opening. The second conveyor belt is located on a mounting frame, and the bottom of the mounting frame is connected to a vertical second electric telescopic rod. The bottom end of the second electric telescopic rod is connected to a moving block, and the bottom end of the moving block is provided with a roller. The roller is located in a track, and the track is located on the top surface of a supporting block. One end of the supporting block is fixed with a horizontal third electric telescopic rod, and the third electric telescopic rod is connected to the side of the moving block. A third conveyor belt which can be matched with the second conveyor belt is arranged below the first conveyor belt;

An ultrasonic generator is arranged on the equipment body.

As the preferred option, the left and right sides of the receiving plate are respectively provided with mounting slots, the front and rear ends of the mounting slots are connected to a rotary rod, and the top end of the rotary rod is connected to a connecting block, which is connected to the outer end of the corresponding movable plate; The bottom end of the receiving plate is provided with a mounting block, the mounting block is provided with a synchronous wheel, the synchronous wheel is driven by the motor, and the synchronous wheel and the rotary rod are covered with a synchronous belt.

As the preferred option, a hole for the synchronous belt to pass through is arranged between the connecting block and the rotary rod, and a convex tooth is arranged in the circumferential direction of the rotary rod part located at the hole.

As the preferred option, the mounting frame includes a bottom plate, the second electric telescopic rod is connected to the bottom end of the bottom plate, and the bottom end of the bottom plate is provided with two groups of vertical rods. The top of each group of vertical rods is provided with a driving wheel, and the driving wheel is covered with a second conveyor belt.

As the preferred option, a group of horizontal cross rods is arranged on the top of a group of vertical rods near the equipment body, and the corresponding driving wheel is installed between the group of cross rods.

As the preferred option, a reinforcement rod is connected between the two groups of vertical rods.

As the preferred option, the first conveyor belt and the third conveyor belt are installed on another mounting frame and the position of the other mounting frame is fixed.

As the preferred option, the placement cavity is cooled by a $CO_2/NH_3$ cascade refrigeration system, and the placement cavity is connected to a waste heat recovery device of the refrigeration system with water supply in the warm area.

The invention also provides an ultrasonic rapid freezing method for meat industry, which adopts the aforementioned ultrasonic rapid freezing equipment for meat industry, and includes the following steps:

I. When bagged meat products are loaded, open the cavity door, and adjust the movable plate to the opening of the placement cavity through the first electric telescopic rod;

II. Through the adjustment of the second electric telescopic rod and the third electric telescopic rod, the inner end of the second conveyor belt is extended to the top of the movable plate, and the outer end of the second conveyor belt corresponds to the first conveyor belt;

III. The bagged meat products are transmitted to the movable plate through the first conveyor belt and the second conveyor belt, and the movable plate slowly drops through the adjustment of the first electric telescopic rod. At the same time, the movable plate rotates back and forth in a small range;

IV. After the placement cavity is filled with bagged meat products, adjust the second conveyor belt to make the inner end of the second conveyor belt leave, and then close the cavity door for freezing;

V. When taking out the bagged meat products, through the adjustment of the second electric telescopic rod and the third electric telescopic rod, the inner end of the second conveyor belt is located at the bottom of the slide plate, and the outer end of the second conveyor belt corresponds to the third conveyor belt;

VI. Open the cavity door, adjust the movable plate slowly through the first electric telescopic rod, and the two movable plates rotate back and forth in a small irregular range, so that the bagged meat products slide down from the slide plate to the second conveyor belt, and then output to the third conveyor belt, so as to complete the removal of the bagged meat products.

As the preferred option, the two motors drive the corresponding rotary rod through the synchronous belt. When the speed and steering of the two motors are different, the two movable plates rotate back and forth in a small irregular range.

The invention can conveniently and stably transmit the bagged meat products to the placement cavity for freezing, and then conveniently and stably transmit the bagged meat products out after freezing, realizing the continuous production on the industrial meat production line, saving time and labor, and having high efficiency.

DETAILED DESCRIPTION OF THE EMBODIMENTS

In order to further understand the content of the invention, the invention is described in detail in combination with the attached drawings and embodiments. It should be understood that the embodiments merely explain and do not qualify the invention.

Embodiment 1

Figure 1:
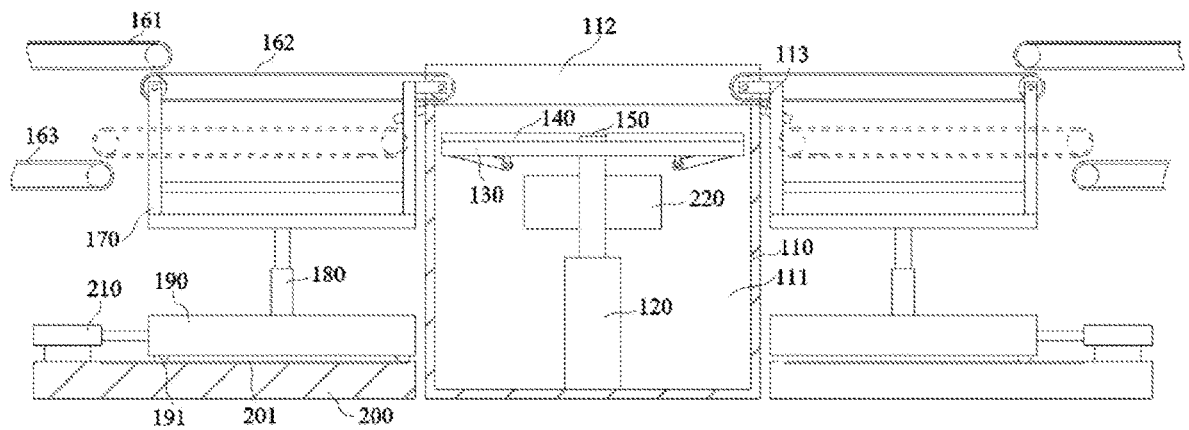
FIG. 1 is the structure diagram of an ultrasonic rapid freezing equipment for meat industry in Embodiment 1.

As shown in FIG. 1, this embodiment provides an ultrasonic rapid freezing equipment for meat industry, which includes the equipment body 110, and a placement cavity 111 with an upward opening is arranged in the equipment body 110. The opening of cavity 111 is provided with a cavity door 112, and a vertical first electric telescopic rod 120 is arranged in the cavity 111. The bottom end of the first electric telescopic rod 120 is provided with a receiving plate 130, and the left and right sides of the receiving plate 130 are respectively rotated and connected to a movable plate 140. The movable plate 140 is driven by a motor to rotate, and the inner end of the two movable plates 140 is connected to an elastic strip 150. The left and right sides of the top of the equipment body 110 are respectively provided with inclined slide plate 113;

Both sides of the equipment body 110 are respectively provided with a first conveyor belt 161, the inner end of the first conveyor belt 161 is equipped with a second conveyor belt 162, and the second conveyor belt 162 can be extended into the opening of placement cavity 111. The second conveyor belt 162 is located on a mounting frame 170, and the bottom of the mounting frame 170 is connected to a vertical second electric telescopic rod 180. The bottom end of the second electric telescopic rod 180 is connected to a moving block 190, and the bottom end of the moving block 190 is provided with a roller 191. The roller 191 is located in a track 201, and the track 201 is located on the top surface of a supporting block 200. One end of the supporting block 200 is fixed with a horizontal third electric telescopic rod 210, and the third electric telescopic rod 210 is connected to the side of the moving block 190. A third conveyor belt 163 which can be matched with the second conveyor belt 162 is arranged below the first conveyor belt 161;

An ultrasonic generator 220 is arranged on the equipment body 110.

The bagged meat products are transferred to the second conveyor belt 162 through the first conveyor belt 161, and then the second conveyor belt 162 transfers the bagged meat products to the placement cavity 111. The movable plate 140 in the placement cavity 111 can receive material while falling, so as to prevent bagged meat products from falling directly and causing damage. The two movable plate 140 can rotate, so that through the irregular rotation of the two movable plate 140, the bagged meat products can be evenly distributed, so that more packaged meat products can be loaded. The elastic strip 150 can prevent the bagged meat products from falling into the gap between the two movable plates 140, and prevent the bagged meat products from getting stuck in the rotation of the movable plate 140.

When the freezing is completed and needs to be transmitted out, the movable plate 140 is raised, and the bagged meat products on the top can be pushed out. The bagged meat products slide off the slide plate 113, and then fall to the second conveyor belt 162 below the slide plate 113, so that the frozen bagged meat products can be transmitted out. When the bagged meat products cannot be pushed out, the irregular rotation of the two movable boards 140 can move the bagged meat products, so that it can easily slide off the slide plate 113.

The second conveyor belt 162 can move up and down, left and right through the adjustment of the second electric telescopic rod 180 and the third electric telescopic rod 210, which is very flexible, so that the second conveyor belt 162 can be aligned with the first conveyor belt 161 to transfer bagged meat products to the placement cavity 111, and can also be aligned with the third conveyor belt 163 to transfer bagged meat products out. The second conveyor belt 162 can be used for two purposes, which can not only transfer bagged meat products in, but also transfer bagged meat products out.

The mounting frame 170 is used to support the second conveyor belt 162. The coordination of roller 191 and track 201 can make the horizontal movement of the mounting frame 170 very stable. Ultrasonic generator 220 can achieve ultrasonic freezing.

Figure 2:
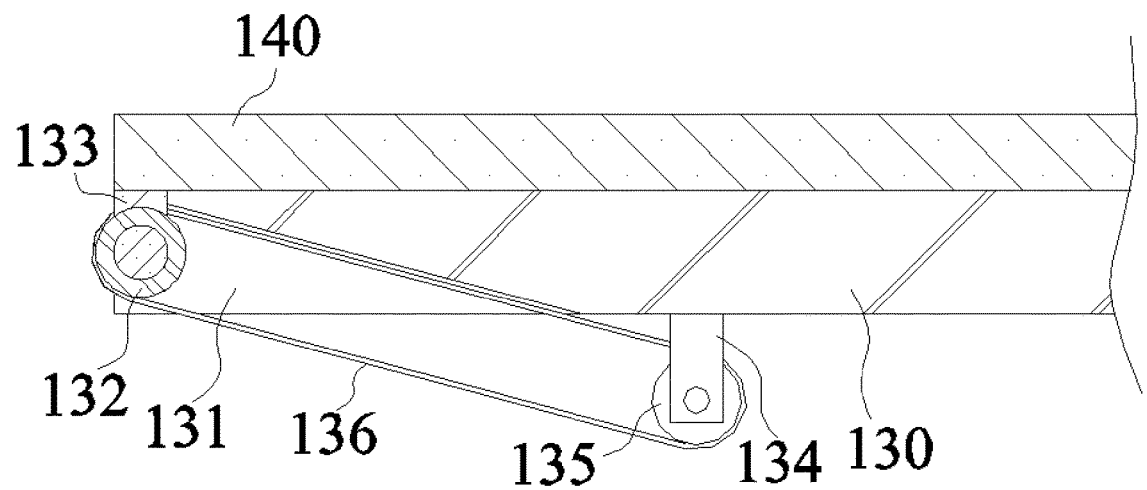
FIG. 2 is the structure diagram of the mounting slot in Embodiment 1.

As shown in FIG. 2, the left and right sides of the receiving plate 130 are respectively provided with mounting slots 131, the front and rear ends of the mounting slots 131 are connected to a rotary rod 132, and the top end of the rotary rod 132 is connected to a connecting block 133, which is connected to the outer end of the corresponding movable plate 140; The bottom end of the receiving plate 130 is provided with a mounting block 134, the mounting block 134 is provided with a synchronous wheel 135, the synchronous wheel 135 is driven by the motor, and the synchronous wheel 135 and the rotary rod 132 are covered with a synchronous belt 136.

The motor drives the synchronous wheel 135 to rotate, the synchronous wheel 135 drives the synchronous belt 136 to rotate, the synchronous belt 136 drives the rotary rod 132 to rotate, and the rotary rod 132 drives the outer end of the movable plate 140 to rotate. In this way, the automatic rotation of the movable plate 140 is realized, which is very convenient.

Figure 3:
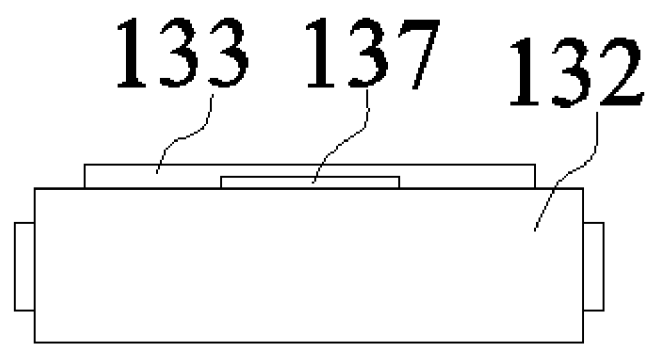
FIG. 3 is the structure diagram of perforation in Embodiment 1.

As shown in FIG. 3, a hole 137 for the synchronous belt 136 to pass through is arranged between the connecting block 133 and the rotary rod 132, and a convex tooth is arranged in the circumferential direction of the rotary rod 132 located at the hole 137.

The motor drives the outer end of the movable plate 140 to rotate stably through the coordination of the convex teeth and the synchronous belt 136.

Figure 4:
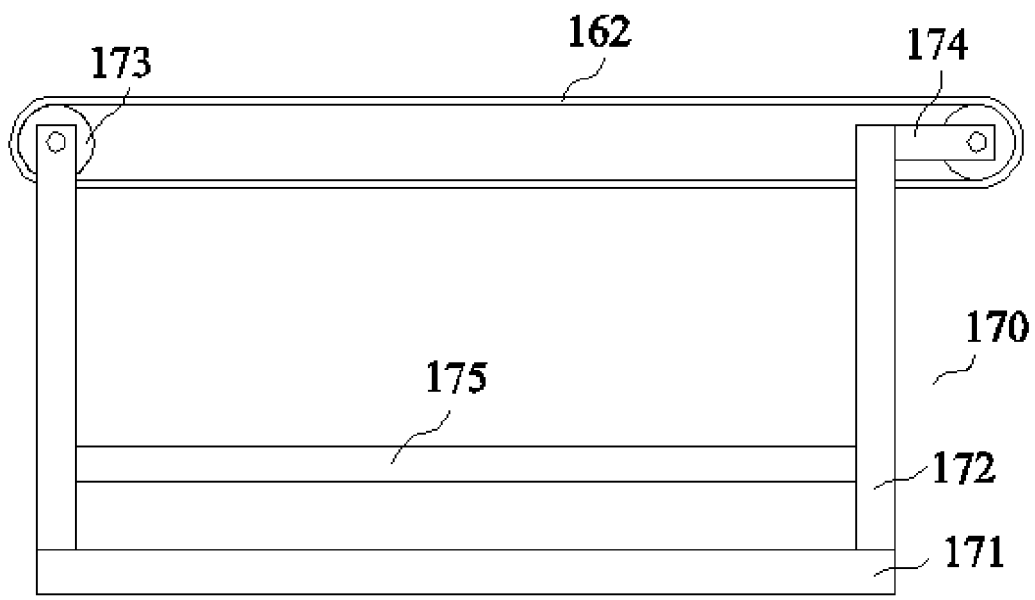
FIG. 4 is the structure diagram of the mounting frame in Embodiment 1.

As shown in FIG. 4, the mounting frame 170 includes a bottom plate 171, the second electric telescopic rod 180 is connected to the bottom end of the bottom plate 171, and the bottom end of the bottom plate 171 is provided with two groups of vertical rods 172. The top of each group of vertical rods 172 is provided with a driving wheel 173, and the driving wheel 173 is covered with a second conveyor belt 162.

A group of horizontal cross rods 174 is arranged on the top of a group of vertical rods 172 near the equipment body 110, and the corresponding driving wheel 173 is installed between the group of cross rods 174.

Through the setting of the cross rod 174, the corresponding driving wheel 173 can be conveniently stretched into the upper part of the placement cavity 111, so as to conveniently drive the bagged meat products to the placement cavity 111.

A reinforcement rod 175 is connected between the two groups of vertical rods 172. Reinforcement rod 175 can improve the stability of mounting frame 170.

The first conveyor belt 161 and the third conveyor belt 163 are installed on another mounting frame 170 and the position of the other mounting frame 170 is fixed.

The placement cavity 111 is cooled by a $CO_2/NH_3$ cascade refrigeration system, and the placement cavity 111 is connected to a waste heat recovery device of the refrigeration system with water supply in the warm area.

The $CO_2/NH_3$ cascade refrigeration system can refer to the patent with the public number of CN204648736U.

The placement cavity 111 is connected to the waste heat recovery device of the refrigeration system with multi-temperature zone water supply. The waste heat recovery device of refrigeration system with multi-temperature area water supply can refer to the patent with the public number of CN106969538B.

This embodiment provides an ultrasonic rapid freezing method for meat industry, which adopts the aforementioned ultrasonic rapid freezing equipment for meat industry, and includes the following steps:

I. When bagged meat products are loaded, open the cavity door 112, and adjust the movable plate 140 to the opening of the placement cavity 111 through the first electric telescopic rod 120;

II. Through the adjustment of the second electric telescopic rod 180 and the third electric telescopic rod 210, the inner end of the second conveyor belt 162 is extended to the top of the movable plate 140, and the outer end of the second conveyor belt 162 corresponds to the first conveyor belt 161;

III. The bagged meat products are transmitted to the movable plate 140 through the first conveyor belt 161 and the second conveyor belt 162, and the movable plate 140 slowly drops through the adjustment of the first electric telescopic rod 120. At the same time, the movable plate 140 rotates back and forth in a small range;

IV. After the placement cavity 111 is filled with bagged meat products, adjust the second conveyor belt 162 to make the inner end of the second conveyor belt 162 leave, and then close the cavity door 112 for freezing;

V. When taking out the bagged meat products, through the adjustment of the second electric telescopic rod 180 and the third electric telescopic rod 210, the inner end of the second conveyor belt 162 is located at the bottom of the slide plate 113, and the outer end of the second conveyor belt 162 corresponds to the third conveyor belt 163;

VI. Open the cavity door 112, adjust the movable plate 140 slowly through the first electric telescopic rod 120, and the two movable plates 140 rotate back and forth in a small irregular range, so that the bagged meat products slide down from the slide plate 113 to the second conveyor belt 162, and then output to the third conveyor belt 163, so as to complete the removal of the bagged meat products.

The two motors drive the corresponding rotary rod 132 through the synchronous belt 136. When the speed and steering of the two motors are different, the two movable plates 140 rotate back and forth in a small irregular range.

This method can conveniently and stably transmit the bagged meat products to the placement cavity for freezing, and then conveniently and stably transmit the bagged meat products out after freezing, realizing the continuous production on the industrial meat production line, saving time and labor, and having high efficiency.

Embodiment 2

Figure 5:
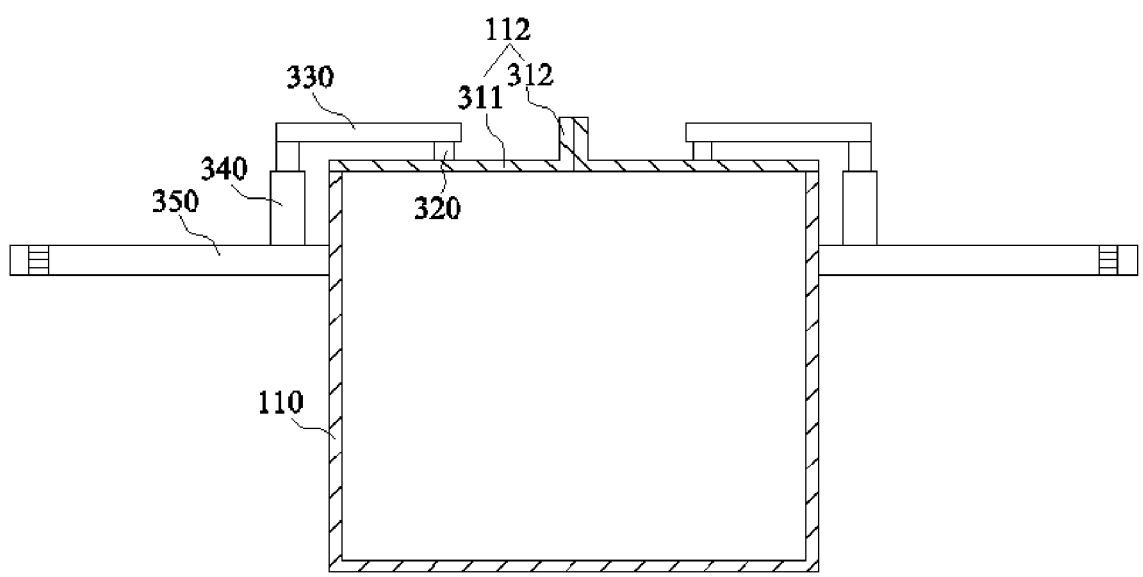
FIG. 5 is the structure diagram of the cavity door in Embodiment 2.

As shown in FIG. 5, the difference between this embodiment and Embodiment 1 is that the cavity door 112 includes a front part and a rear part, both of which include cover plate 311; the inner end of cover plate 311 is provided with a baffle 312; the top surface of cover plate 311 is provided with a convex block 320; the convex block 320 is connected to a horizontal rod 330; the outer end of the horizontal rod 330 is connected to a fourth electric telescopic rod 340; the bottom end of the fourth electric telescopic rod 340 is connected to a horizontal linear actuator 350; the fourth electric telescopic rod 340 can move horizontally on the linear actuator 350.

The front and rear of the cavity door 112 can be moved up and down and horizontally under the drive of the fourth electric telescopic rod 340 and the linear actuator 350. In this way, the front and rear switches are flexible, and once they are in place, the inside of the baffle 312 can be aligned with the wall of the placement cavity 111. In this way, when the bagged meat products are loaded or removed, the baffle 312 can play the role of blocking, so that the bagged meat products can enter the predetermined position.

The above schematic description of the present invention and its embodiment is not limited. The description is only one of the embodiment of the present invention shown in the attached drawing, and the actual structure is not limited to it. Therefore, If an ordinary technician in the field is inspired by the invention and does not deviate from the purpose of creation of the invention, and does not creatively design a structure mode and an embodiment similar to the technical scheme, the invention shall fall within the scope of protection.

What is claimed is:

1. An ultrasonic rapid freezing equipment for a meat industry, comprising an equipment body, wherein a placement cavity with an upward opening is arranged in the equipment body; the upward opening of the placement cavity is provided with a cavity door, and a vertical first electric telescopic rod is arranged in the placement cavity; a bottom end of the vertical first electric telescopic rod is provided with a receiving plate, and left and right sides of the receiving plate are respectively rotated and connected to a movable plate; the movable plate is driven by a motor to rotate, and an inner end of the movable plate is connected to an elastic strip; left and right sides of a top of the equipment body are respectively, provided with an inclined slide plate;

both sides of the equipment body are respectively provided with a first conveyor belt; an inner end of the first conveyor belt is equipped with a second conveyor belt, and the second conveyor belt is allowed to be extended into the upward opening of the placement cavity; the second conveyor belt is located on a mounting frame; and a bottom of the mounting frame is connected to a vertical second electric telescopic rod; a bottom end of the vertical second electric telescopic rod is connected to a moving block, and a bottom end of the moving block is provided with a roller; the roller is located in a track, and the track is located on a top surface of a supporting block; one end of the supporting block is fixed with a horizontal third electric telescopic rod, and the horizontal third electric telescopic rod is connected to a side of the moving block; a third conveyor belt matched with the second conveyor belt is arranged below the first conveyor belt;

an ultrasonic generator is arranged on the equipment body;

the left and right sides of the receiving plate are respectively provided with mounting slots, front and rear ends of the mounting slots are connected to a rotary rod, and a top end of the rotary rod is connected to a connecting block, wherein the connecting block is connected to an outer end of the movable plate; a bottom end of the receiving plate is provided with a mounting block, the mounting block is provided with a synchronous wheel, the synchronous wheel is driven by the motor, and the synchronous wheel and the rotary rod are covered with a synchronous belt.

2. The ultrasonic rapid freezing equipment according to claim 1, wherein a hole for the synchronous belt to pass through is arranged between the connecting block and the rotary rod, and a convex tooth is arranged in a circumferential direction of the rotary rod located at the hole.

3. The ultrasonic rapid freezing equipment according to claim 1, wherein the mounting frame comprises a bottom plate, wherein the vertical second electric telescopic rod is connected to a bottom end of the bottom plate, and the bottom end of the bottom plate is provided with two groups of vertical rods; a top of each group of vertical rods is provided with a driving wheel, and the driving wheel is covered with the second conveyor belt.

4. The ultrasonic rapid freezing equipment according to claim 3, wherein a group of horizontal cross rods is arranged on a top of a group of vertical rods near the equipment body, and the driving wheel is installed between the group of cross rods.

5. The ultrasonic rapid freezing equipment according to claim 4, wherein a reinforcement rod is connected between the two groups of vertical rods.

6. The ultrasonic rapid freezing equipment according to claim 5, wherein the first conveyor belt and the third conveyor belt are installed on another mounting frame and a position of the other mounting frame is fixed.

7. The ultrasonic rapid freezing equipment according to claim 1, wherein the placement cavity is cooled by a $CO_2/NH_3$ cascade refrigeration system, and the placement cavity is connected to a waste heat recovery device of the $CO_2/NH_3$ cascade refrigeration system with water supply in a warm area.

8. An ultrasonic rapid freezing method for a meat industry, using the ultrasonic rapid freezing equipment for the meat industry according to claim 1, and comprising the following steps:

step I: when bagged meat products are loaded, opening the cavity door, and adjusting the movable plate to the upward opening of the placement cavity through the vertical first electric telescopic rod;

step II: through an adjustment of the vertical second electric telescopic rod and the horizontal third electric telescopic rod, extending an inner end of the second conveyor belt to a top of the movable plate, wherein an outer end of the second conveyor belt corresponds to the first conveyor belt;

step III: transmitting the bagged meat products to the movable plate through the first conveyor belt and the second conveyor belt, and dropping the movable plate slowly through an adjustment of the vertical first electric telescopic rod; at the same time, allowing the movable plate to rotate back and forth in a small range;

step IV: after the placement cavity is filled with the bagged meat products, adjusting the second conveyor belt to make the inner end of the second conveyor belt leave, and then closing the cavity door for freezing;

step V: when taking out the bagged meat products, through the adjustment of the vertical second electric telescopic rod and the horizontal third electric telescopic rod, allowing the inner end of the second conveyor belt to be located at a bottom of the inclined slide plate, wherein the outer end of the second conveyor belt corresponds to the third conveyor belt;

step VI: opening the cavity door, adjusting the movable plate slowly through the vertical first electric telescopic rod, and allowing the movable plate to rotate back and forth in a small irregular range, so that the bagged meat products slide down from the inclined slide plate to the second conveyor belt, and are then output to the third conveyor belt, so as to complete a removal of the bagged meat products.

9. The ultrasonic rapid freezing method according to claim 8, wherein the motor drives the rotary rod through the synchronous belt; when speed and steering of the motor are different, the movable plate rotates back and forth in the small irregular range.

10. The ultrasonic rapid freezing method according to claim 8, wherein in the ultrasonic rapid freezing equipment, a hole for the synchronous belt to pass through is arranged between the connecting block and the rotary rod, and a convex tooth is arranged in a circumferential direction of the rotary rod located at the hole.

11. The ultrasonic rapid freezing method according to claim 8, wherein in the ultrasonic rapid freezing equipment, the mounting frame comprises a bottom plate, wherein the vertical second electric telescopic rod is connected to a bottom end of the bottom plate, and the bottom end of the bottom plate is provided with two groups of vertical rods; a top of each group of vertical rods is provided with a driving wheel, and the driving wheel is covered with the second conveyor belt.

12. The ultrasonic rapid freezing method according to claim 11, wherein in the ultrasonic rapid freezing equipment, a group of horizontal cross rods is arranged on a top of a group of vertical rods near the equipment body, and the driving wheel is installed between the group of cross rods.

13. The ultrasonic rapid freezing method according to claim 12, wherein in the ultrasonic rapid freezing equipment, a reinforcement rod is connected between the two groups of vertical rods.

14. The ultrasonic rapid freezing method according to claim 13, wherein in the ultrasonic rapid freezing equipment, the first conveyor belt and the third conveyor belt are installed on another mounting frame and a position of the other mounting frame is fixed.

15. The ultrasonic rapid freezing method according to claim 8, wherein in the ultrasonic rapid freezing equipment, the placement cavity is cooled by a $CO_2/NH_3$ cascade refrigeration system, and the placement cavity is connected to a waste heat recovery device of the $CO_2/NH_3$ cascade refrigeration system with water supply in a warm area.

* * * * *